(12) United States Patent
Kodama et al.

(10) Patent No.: US 7,280,553 B2
(45) Date of Patent: Oct. 9, 2007

(54) TRANSCEIVER AND COMMUNICATION METHOD FOR DIGITAL MULTI CARRIER COMMUNICATION

(75) Inventors: Nobutaka Kodama, Fukuoka (JP); Hisao Koga, Fukuoka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 11/113,322

(22) Filed: Apr. 25, 2005

(65) Prior Publication Data

US 2005/0249234 A1 Nov. 10, 2005

(30) Foreign Application Priority Data

Apr. 28, 2004 (JP) .................... P. 2004-133128

(51) Int. Cl.
*H04B 7/212* (2006.01)
(52) U.S. Cl. .................... 370/443; 370/337; 370/445
(58) Field of Classification Search ................ 370/443, 370/337, 445
See application file for complete search history.

(56) References Cited

U.S. PATENT DOCUMENTS

| | | | |
|---|---|---|---|
| 4,885,563 A | 12/1989 | Johnson et al. | |
| 5,289,476 A | 2/1994 | Johnson et al. | |
| 5,770,996 A | 6/1998 | Severson et al. | |
| 6,727,804 B1 | 4/2004 | Lesguillier et al. | |
| 6,809,633 B2 | 10/2004 | Cern | |
| 6,907,044 B1 * | 6/2005 | Yonge et al. ............... | 370/445 |
| 2004/0160990 A1 * | 8/2004 | Logvinov et al. ........... | 370/509 |

FOREIGN PATENT DOCUMENTS

| | | |
|---|---|---|
| DE | 10026931 | 10/2001 |
| EP | 1162759 | 12/2001 |
| EP | 1475901 | 11/2004 |
| WO | 03003631 | 1/2003 |
| WO | 03069796 | 8/2003 |

OTHER PUBLICATIONS

International Search Report dated Sep. 25, 2005.
Makoto Itami, "OFDM Modulation Technique for Digital Broadcast/Mobile Communication," Triceps, pp. 30-31, 2000 with partial English translation.

* cited by examiner

Primary Examiner—Huy D. Vu
Assistant Examiner—Jason Mattis
(74) Attorney, Agent, or Firm—Stevens, Davis, Miller & Mosher, LLP (57) ABSTRACT

The present invention relates to a transceiver and communication method involving a time division multiple transmission method, which performs data transmission among a plurality of transceivers. The transceiver includes a transmitter sending data, a receiver receiving data, a switch operable to switch among connecting the transmitter to a transmission line, connecting the receiver to the transmission line, or disconnecting both the transmitter and the receiver to the transmission line or connecting the transmission line to high impedance, and a controller operable to control the switch. The switch connects the transmitter or the receiver to the transmission line at a time that the transceiver has a relation to a communication designated by the time division multiplex transmission method. On the other hand, the switch disconnects the transmitter or the receiver to the transmission line or connects the transmission line to the high impedance at a time that the transceiver does not have a relation to the communication designated by the time division multiplex transmission method.

3 Claims, 11 Drawing Sheets

| CHANNEL NUMBER | TRANS- CEIVER ID | TRANS- CEIVER ID | CHANNEL NUMBER | TRANS- CEIVER ID | TRANS- CEIVER ID | CHANNEL NUMBER | TRANS- CEIVER ID | TRANS- CEIVER ID |
|---|---|---|---|---|---|---|---|---|
| 1 | 00 | 01 | 2 | FF | 0A | 3 | 02 | 03 |

FIG. 5

| TRANS- CEIVER ID | TRANS- CEIVER ID | TRANS- CEIVER ID | TRANS- CEIVER ID | TRANS- CEIVER ID | TRANS- CEIVER ID |
|---|---|---|---|---|---|
| 00 | 01 | FF | 0A | 02 | 03 |
| CHANNEL NUMBER 1 | | CHANNEL NUMBER 2 | | CHANNEL NUMBER 3 | |

TRANSCEIVER AND COMMUNICATION METHOD FOR DIGITAL MULTI CARRIER COMMUNICATION

BACKGROUND OF THE INVENTION

1. Field of the Invention

The present invention relates to a transceiver and communication method employing time division multiple transmission methods, which performs data transmission among a plurality of transceivers.

2. Description of the Related Art

Time division multiple transmission methods such as Time Division Multiple Access (TDMA) or Carrier Sense Multiple Access (CSMA) are technologies that multiplex signals of a plurality of channels on the time-axis by sending the signals at different times, respectively. The time division multiple transmission methods are widely used in digital telecommunication and computer networks as described in many books, for example, "OFDM Modulation Technology For Digital Broadcasting And Mobile Communication," Makoto Itami, Triceps, 2000.

Figure 10:
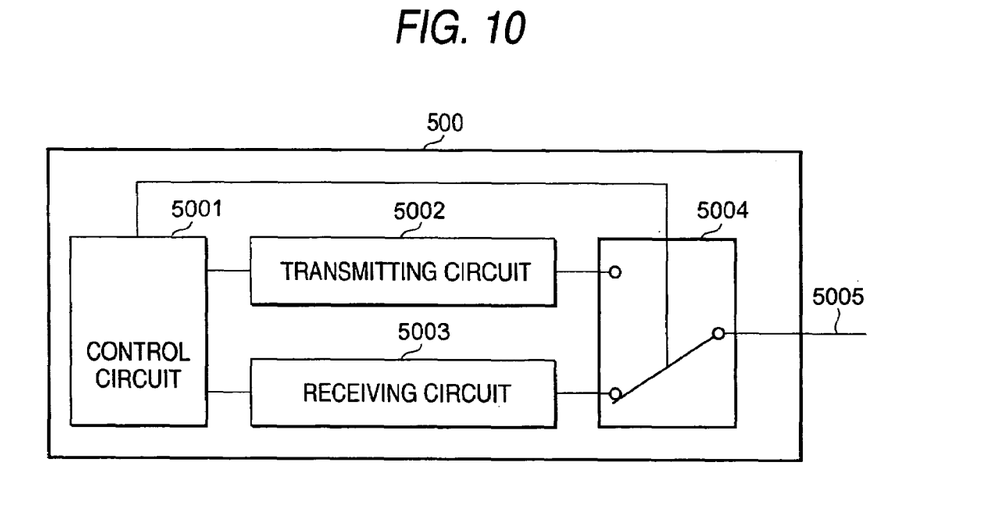
FIG. 10 is a block diagram showing a transceiver involving one of time division multiple communication methods according to the prior art.

In the time division multiple communication method, transmitted data from a transmitter are divided into base units, which are called "packets", "slots" or "frames." Each packet of a channel is sent in proper timing by a multiplexer. In a receiver, a process that a demultiplexer picks up signals of the channel, which are required for the communication, is performed in a transceiver that works as a receiver. As shown in FIG. 10, a transceiver 500 involving one of the time division multiple communication methods includes a control circuit 5001, a transmitting circuit 5002, a receiving circuit 5003, and a switch 5004. The control circuit 5001 performs digital signal processing including producing transmitting signals and demodulating receiving signals, outputs the digital transmitting signals and controls the transmitting circuit 502, the receiving circuit 5003, and the switch 5004. The transmitting circuit 5002 converts the digital transmitting signals to analog transmitting signals, and outputs the analog transmitting signals to a transmission line 5005 outside of the transceiver 500 via switch 5005. The receiving circuit 5003 receives analog receiving signals from the transmission line 5005 outside of the transceiver 500 via the switch 5004, converts the analog receiving signals to digital signals, and outputs the digital receiving signals to the control circuit 5001. The switch 5004 is controlled by a control signal from the control circuit 5001 so that the switch 5004 switches between two positions connected to the transmitting circuit 5002 and the receiving circuit 5003.

From an analog viewpoint, the switch 5004 in the transceiver 500 switches between two positions of receiving position and transmitting position. Therefore, all of transceivers except a transceiver that works as a transmitter are under the receiving condition.

Figure 11:
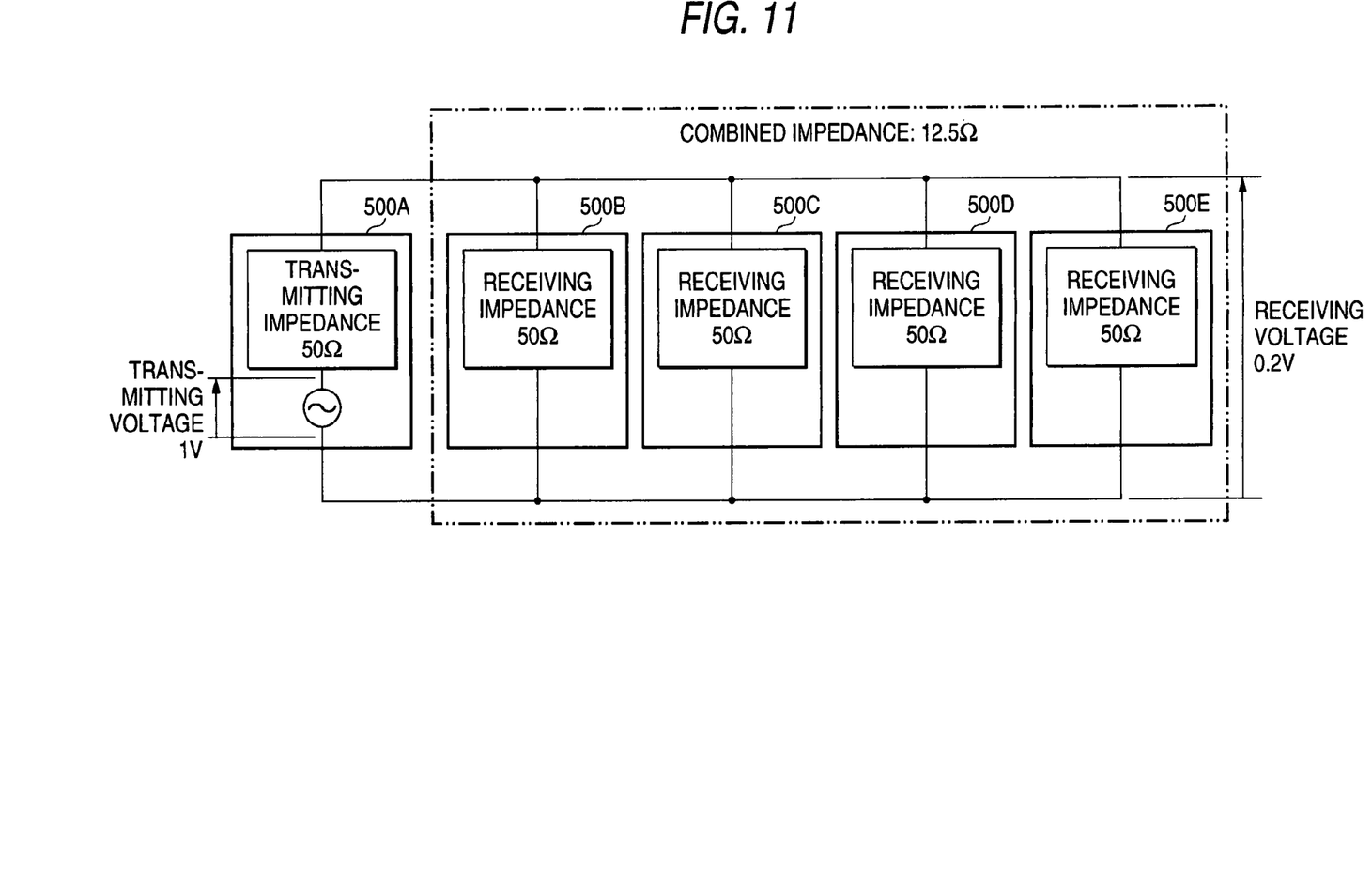
FIG. 11 is a circuit block diagram with five transceivers.
Figure 12:
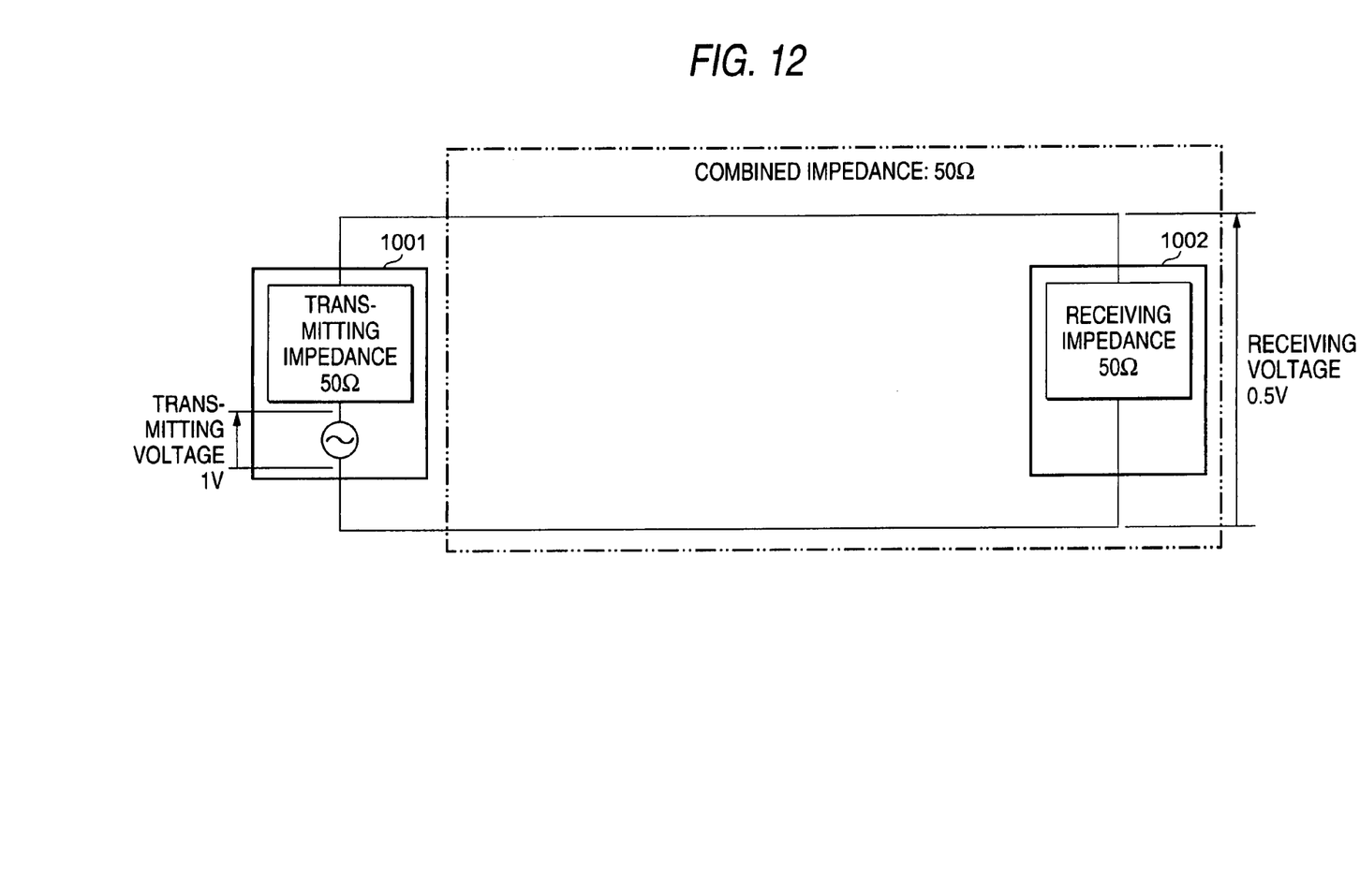
FIG. 12 is a circuit block diagram with two transceivers.

Accordingly, for example, as shown in FIG. 11, when there are five transceivers 500A, 500B, 500C, 500D, and 500E, each of which has 50 (Ω) impedance of internal transmission line and the transceiver 500A sends data to the transceiver 500B, then receiving power in the transceiver 500B will decrease by 8 dB in comparison with the situation shown in FIG. 12, in which there are only two transceivers 500A and 500B. One reason why the receiving power in the transceiver 500B will decrease by 8 dB is considered to be because each impedance of the three transceivers 500C, 500D, and 500E in disuse for the communication affects the transceiver 500B as combined impedance as these transceivers 500C, 500D, and 500E are connected in parallel to the transceiver 500B. In general, each of the transceivers 500A, 500B, 500C, 500D, and 500E may have both transmitting impedance and receiving impedance under normal conditions. However, as a matter of convenience, the receiving impedance in the transceiver 500A and the transmitting impedance in the transceivers 500B, 500C, 500D, and 500E are not shown and considered in FIGS. 11 and 12.

In particular, the combined impedance among the transceivers 500B, 500C, 500D, and 500E is 12.5 (Ω). Accordingly, receiving voltage of the transceiver 500B becomes 0.2V in light of the combined receiving impedance 12.5 (Ω) and the transmitting impedance 50 (Ω) when the transmitting voltage of the transceiver 500A is 1.0V. The receiving voltage (0.2V) in FIG. 10 decreases by 8 dB in comparison with the receiving voltage (0.5V) in FIG. 11.

The 8 dB decrease of the receive voltage leads to a 8 db decrease of the ratio of signal to noise (S/N) in transceiver 500B. Furthermore, this 8 dB S/N decrease may diminish the transmission efficiency of the transmission line by a factor of four. For example, where 16 Quadrature Amplitude Modulation (QAM) with a reception bit error rate of $10^{-5}$ may be employed in the system illustrated by FIG. 12, the 8 dB diminution of S/N in the system illustrated by FIG. 11 may restrict this system to the use of Binary Phase Shift Keying (BPSK) as a modulation/demodulation method.

As mentioned above, one or more unused transceivers connected to a transmission line during a communication causes a decrease in receiving power in a transceiver undergoing communication when a time division multiple transmission method is used. Accordingly, connection of the unused transceiver(s) to the transmission line results in a decrease of the S/N of the transceiver in use for the communication.

SUMMARY OF THE INVENTION

The present invention is made in view of the above-mentioned problem. An object of the present invention is to increase the reception power of a communication for a transceiver, a communication system and a communication method in a time division multiple transmission method.

According to the invention, every transceiver, which has no relation with a communication at a particular time, disconnects to a transmission line or connects to high impedance. This configuration makes it possible that every transceiver, which has no relation with a communication at a particular time, disconnects to a transmission line and only two transceivers related to the communication connect to the transmission line at one time. Accordingly, this configuration can minimize decreasing of receiving power in a receiving transceiver, because this configuration can be reduced an influence of the combined impedance caused by the transceivers which are not related to the communication as above-mentioned. Therefore, the receiving transceiver can receive transmitting signals outputted from the transmitting transceiver with the maximal receiving power.

DETAILED DESCRIPTION OF THE INVENTION

Figure 1:
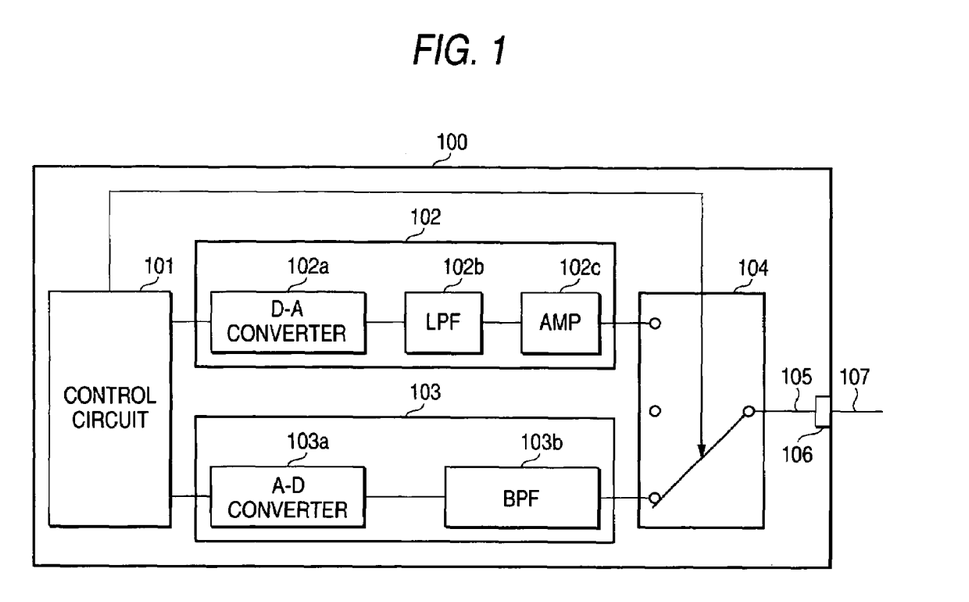
FIG. 1 is a block diagram showing a transceiver involving a time division multiple communication method, according to a first embodiment of the invention.

Preferred embodiments of the invention will be described with reference to FIGS. 1 and 9.

FIRST EMBODIMENT

A transceiver 100 involving at least one of time division multiple communication methods includes a control circuit 101, a transmitting circuit 102, a receiving circuit 103, and a switch 104. The control circuit 101 performs digital signal processing including producing digital transmitting signals and demodulating digital receiving signals, outputs the digital transmitting signals and controls the transmitting circuit 102, the receiving circuit 103, and the switch 104. In this embodiment, FPGA (Field Programmable Gate Alley) is used as the control circuit 101. The control circuit 101 includes a clock. The transmitting circuit 102 converts the digital transmitting signals outputted from the control circuit 101 to analog transmitting signals, and outputs the analog transmitting signals to a transmission line 105 via the switch 104. The transmitting circuit 102 includes a digital/analog converter 102a, a low pass filter 102b and an amplifier 102c. In this embodiment, a D/A converter "AD9866BCPZ" produced by Analog Devices, Inc. may be used as the D/A converter 102a, which includes an auto gain controller. A discrete type low pass filter is used as the low pass filter 102b. An amplifier "OPA2674I-140" may be used as the amplifier 102c. An analog switch "DG202BDV" produced by Vishay Siliconix Incorporated may be used as the switch 104 in this embodiment. The transmission line 105 is connected to an outside transmission line 107, which is outside of the transceiver 100 through a connector 106. A power line is used as the outside transmission line 107. The receiving circuit 103 receives analog receiving signals from the transmission line 105 via the switch 104, converts the analog receiving signals to digital receiving signals, and outputs the digital receiving signals to the control circuit 101. The receiving circuit 103 includes an analog/digital converter 103a and a band pass filter 103b. In this embodiment, an AD9866BCPZ produced by Analog Devices, Inc. may be used as the A/D converter 103a, which includes an auto gain controller. A discrete type band pass filter is used as the band pass filter 103b. The switch 104 is controlled by a control signal from the control circuit 101 so that the switch 104 can switch among first, second, and third positions. The first position connects the transmission line 105 and the transmitting circuit 102. The second position connects the transmission line 105 and the receiving circuit 103. The third position is connected to neither the transmitting circuit 102 nor the receiving circuit 103. Both a mechanical switch and a so-called software switch can be used as the switch 104.

Figure 2:
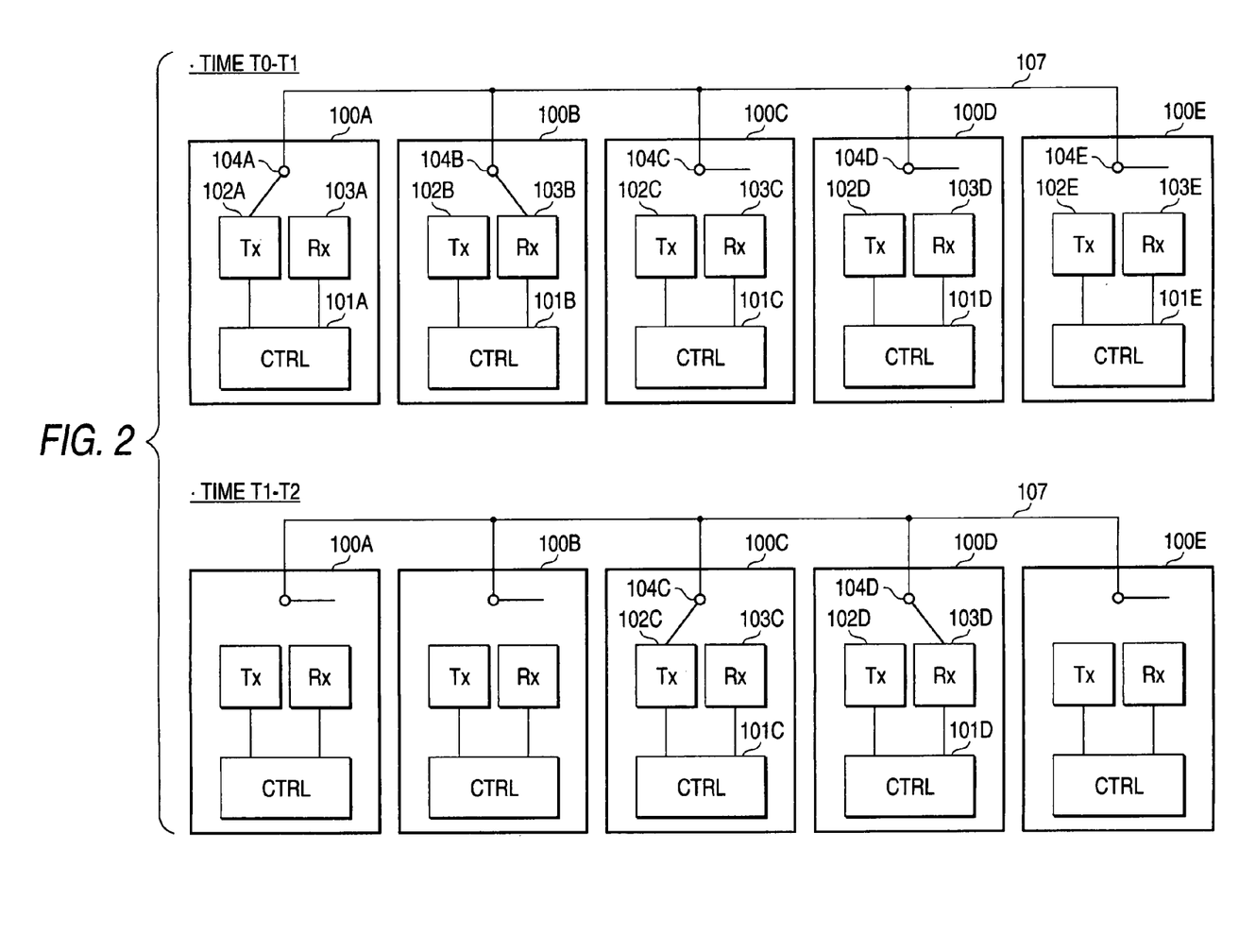
FIG. 2 is a circuit block diagram showing a communication system with five transceivers.

An operation of a communication system using a plurality of the transceivers 100 will be described with reference to FIG. 2. As shown in FIG. 2, the communication system has five transceivers 100A, 100B, 100C, 100D, and 100E, each of which has the same configuration as the transceiver 100 shown in FIG. 1. In addition, it is assumed in this embodiment that each of the respective control circuits of the transceivers 100A, 100B, 100C, 100D, and 100E in advance knows the time when each control circuit 101 can transmit or receive a signal. In the first embodiment, the transceiver 100A will transmit a signal to the transceiver 100B from time T0 to T1. Then, the transceiver 100C will transmit a signal to the transceiver 100D from time T1 to T2.

First, an operation of the communication system from time T0 to T1 will be described. The control circuit 101A outputs a transmitting signal to the transmitting circuit 102A and a switch control signal to the switch 104A so that the switch 104A switches to the first position connected to the transmitting circuit 102A. The control circuit 101B outputs a switch control signal to the switch 104B so that the switch 104B switches to the second position connected to the receiving circuit 103B. The receiving circuit 103B receives the transmitting signal outputted from the transmitting circuit 102A, and outputs a digital receiving signal to the control circuit 101B. Then, the control circuit 101B processes a demodulation of the digital receiving signal outputted from the receiving circuit 103B.

During this operation, the transceivers 100C, 100D, and 100E, which have no relation with the communication at time T0, do not connect any one of the transmitting circuit 102C, 102D, 102E and the receiving circuit 103C, 103D, 103E, and hold this condition until the time when next communication will be permitted. This configuration makes it possible that only two transceivers 100A and 100B of five transceivers 100A to 100E connect to the transmission line 107 from time T0 to T1. Accordingly, this configuration can minimize decreasing of receiving power in the transceiver 100B, because this configuration can reduce an influence of the combined impedance caused by the transceivers 100C, 100D, 100E, which are not related to the communication as above-mentioned. Therefore, the transceiver 100B can receive the transmitting signal outputted from the transceiver 100A with the maximal receiving power.

Next, an operation of the communication system from time T1 to T2 will be described. The control circuit 101C outputs a transmitting signal to the transmitting circuit 102C and also outputs a switch control signal to the switch 104C so that the switch 104C switches to the first position connected to the transmitting circuit 102C. The control circuit 101D outputs a switch control signal to the switch 104D so that the switch 104D switches to the second position connected to the receiving circuit 103D. The receiving circuit 103D receives the transmitting signal outputted from the transmitting circuit 102C, and outputs a digital receiving signal to the control circuit 101D. Then, the control circuit 101D processes a demodulation of the digital receiving signal outputted from the receiving circuit 103C.

During this operation, the transceivers 100A, 100B, and 100E, which are not related with the communication at time T1, do not connect any one of the transmitting circuit 102A, 102B, 102E and the receiving circuit 103A, 103B, 103E, and hold this condition until the time when a next communication will be permitted. Controlling these five transceivers 100A to 100E according to this configuration makes it possible that only two transceivers 100C and 100D of five transceivers connect to the transmission line 107 from time T1 to T2. Accordingly, this configuration makes it possible to minimize decreasing of receiving power in the transceiver 100D, because this configuration can reduce an influence of the combined impedance caused by the transceivers 100A, 100B, 100E, which are not related to the communication as above-mentioned. Therefore, the transceiver 100D can receive the transmitting signal outputted from the transceiver 100C without being robbed of its receiving power by the transceivers 100A, 100B, and 100E.

In addition, although only two cases of both transmitting signals from the transceiver 100A to the transceiver 100B and transmitting signals from the transceiver 100C to the transceiver 100D are described in this embodiment, a similar result can be achieved if each transceiver 100 performs the above-mentioned operation at each time.

Furthermore, in the first embodiment, if one transceiver 100 of five transceivers 100A to 100E does not relate to the communication, then the switch 104 of the one transceiver 100 will disconnect to the transmission line 105. However, it is possible to configure to connect the switch to a terminal which has high impedance such as 50 (kΩ) instead of disconnecting to the transmission line. In this case, "high impedance" means that an impedance of the terminal is sufficiently higher than impedance inside the ordinary transceiver so that the higher impedance prevents current from passing in the transceiver connected to the terminal with the high impedance. In particular, it is sufficient that the high impedance is more than 50 (Ω) in comparison with about 50 (Ω) of the ordinary transceivers. Furthermore, it is preferable that the high impedance is more than 1 (MΩ) because of almost no drop in the receiving power in the communication system.

SECOND EMBODIMENT

Figure 3:
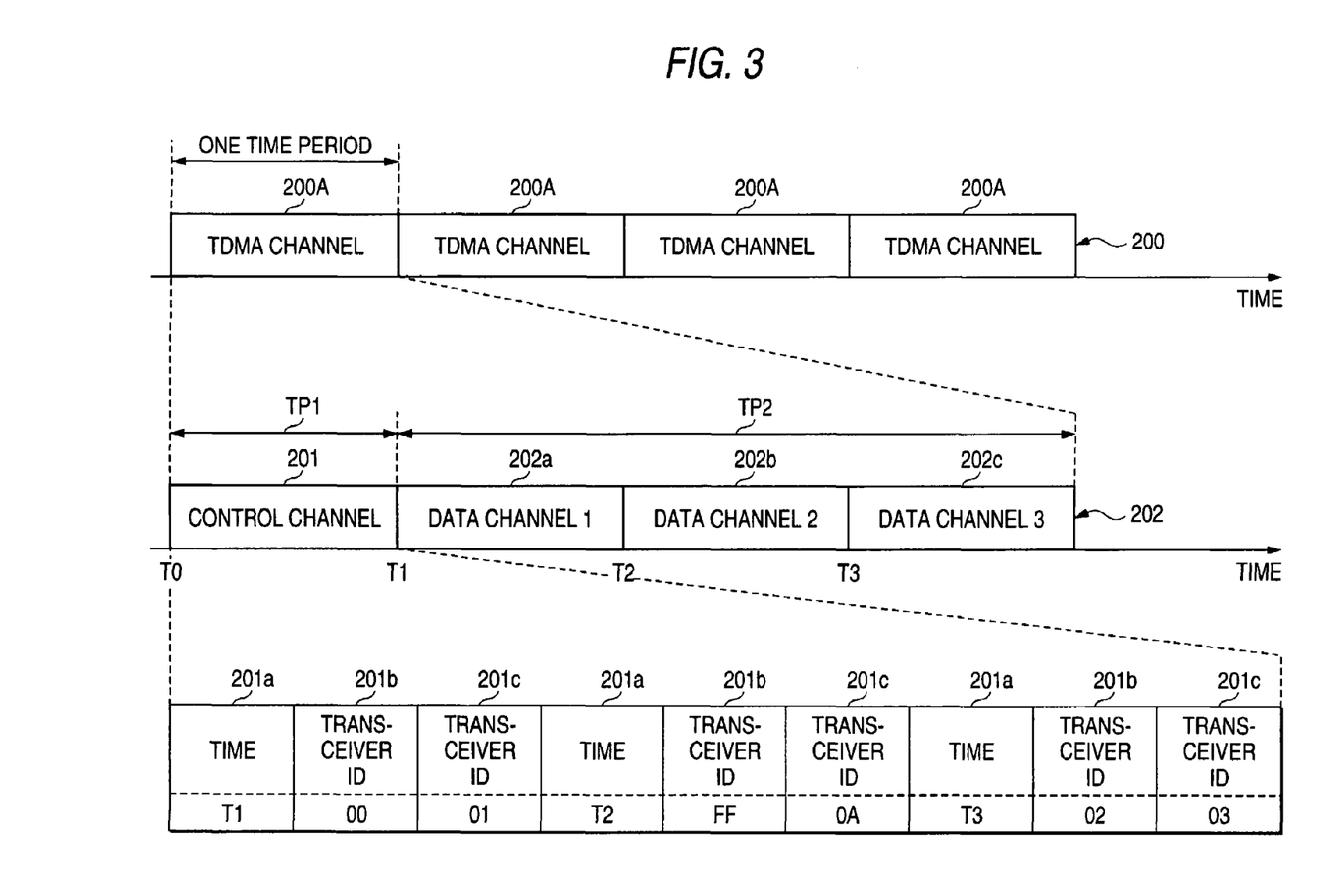
FIG. 3 is a schematic diagram showing an example of a channel configuration involving a time division multiple communication method, according to a first embodiment of the invention.

A channel configuration used in the communication system described in the first embodiment will be described in detail in the second embodiment. TDMA is used as a time division multiple communication method. As shown in FIG. 3, a transmission channel 200 has at least a TDMA channel 200A. Each TDMA channel 200A has a control channel 201 and at least one data channel 202. The transmission channel 200, in general, has a plurality of the TDMA channels 200A as shown in FIG. 3, and the TDMA channel 200A has a data channel 202 including plural data channels 202a, 202b, 202c. The control channel 201 is periodically sent from the transceiver 100 shown in FIG. 1, and shows information about when a communication may start with reference to receiving time of this control channel (Time Information 201a) and which transceivers can communicate with each other (ID Information 201b and 201c). The control channel 201 can include several sets of the time information 201a and the ID information 201b and 201c corresponding to the number of the data channels 202.

In particular, as shown in FIG. 3, the control channel 201 includes data showing that at time T1 a transceiver to transmit data is a transceiver "00" and another transceiver to receive data is a transceiver "01", at time T2 a transceiver to transmit data is a transceiver "FF" and another transceiver to receive data is a transceiver "0A", and at time T3 a transceiver to transmit data is a transceiver "02" and another transceiver to receive data is a transceiver "03".

Meanwhile, the data channel 202 includes data to be transmitted.

For example, in FIG. 3, there are three data channels 202a, 202b, and 202c. According to the control channel 201, the first data channel 202a will start to be sent from a transceiver which ID is "00" to a transceiver which ID is "01," at time T1. Next, the second data channel 202b will start to be sent from a transceiver which ID is "FF" to a transceiver which ID is "0A" at time T2. Then, the third data channel 202c will start to be sent from a transceiver which ID is "02" to a transceiver which ID is "03" at time T3.

All transceivers except a transceiver working as a transmitter should be ready for receiving data in a period TP1 that the control channel 201 will be sent. This configuration can make each of all transceivers to be connected to the outside transmission line 107 recognize the length of time when each of the transceivers can be receiving data.

Accordingly, in each of the transceivers 100, each of the control circuits 101 can control each of switches 104 with reference with the control channel 201. Therefore, this configuration can minimize decreasing of receiving power in the transceiver at data receiving.

After receiving information of the control channel 201, an operation of the communication system is the same as the operation of the first embodiment. The switch 104 will connect to the transmitting circuit 102 in a transceiver 100 which will transmit data. In a transceiver which will receive data, the switch 104 will connect to the receiving circuit 103. In a transceiver which will neither transmit nor receive data, the switch 104 will not connect to either of the transmitting circuit 102 and the receiving circuit 103.

The above-mentioned configuration makes it possible to maximize the receiving power of the transceiver working as a receiver, that is, to maximize the ratio of signal to noise, since, in the entire length of time for data transmission, only the transceivers transmitting or receiving data are connected to the outside transmission line 107, substantially. Accordingly, this configuration can improve transmission efficiency in this communication system.

Figure 4:
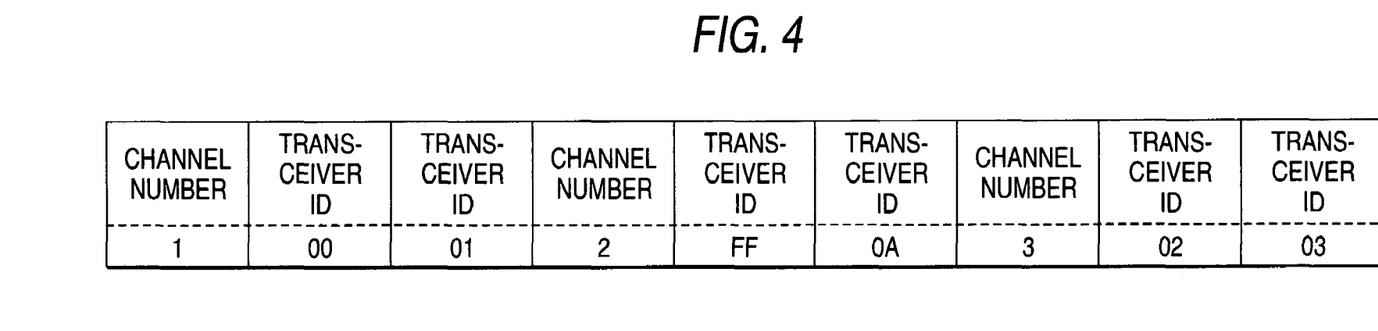
FIG. 4 is a schematic diagram showing an example of a TDMA control channel described in a control channel involving a time division multiple communication method, according to a second embodiment of the invention.

Furthermore, instead of the time information 201a, the numbers of an unique unit can be included as channel number information in the control channel 201 by setting a particular length of time as an unique unit, for example, a symbol, as shown in FIG. 4.

Figure 5:
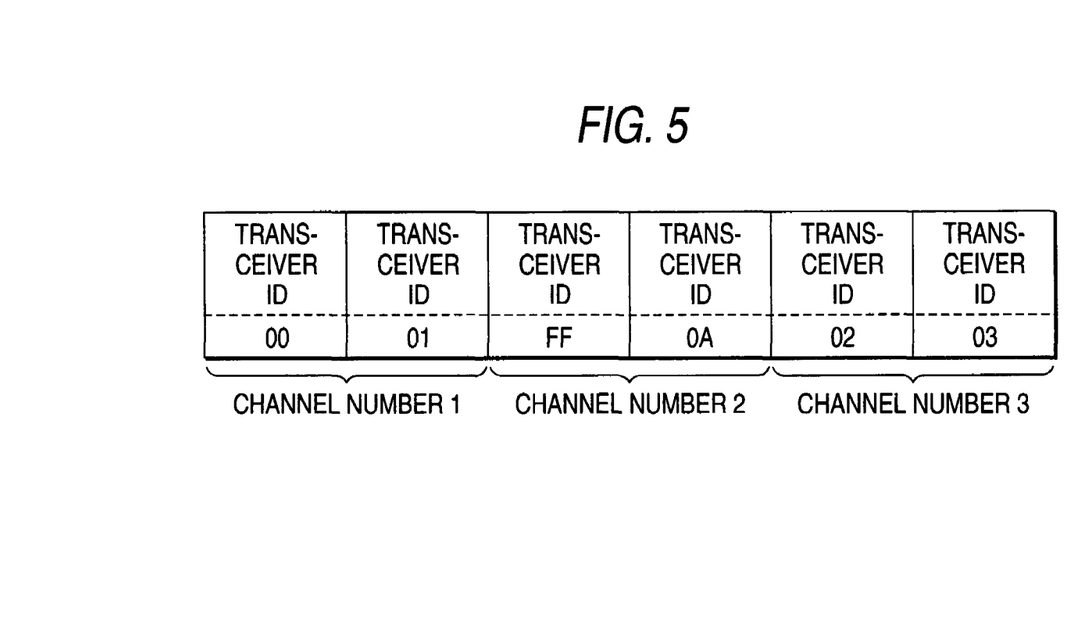
FIG. 5 is a schematic diagram showing an example of a TDMA control channel described in a control channel involving a time division multiple communication method, according to a second embodiment of the invention.

Meanwhile, as shown in FIG. 5, only the ID information can be included in the control channel 201 when the length of each data channel is fixed. In these configurations, since the amount of data of the control channel 201 can be decreased, data transmission efficiency can increase.

THIRD EMBODIMENT

Figure 6:
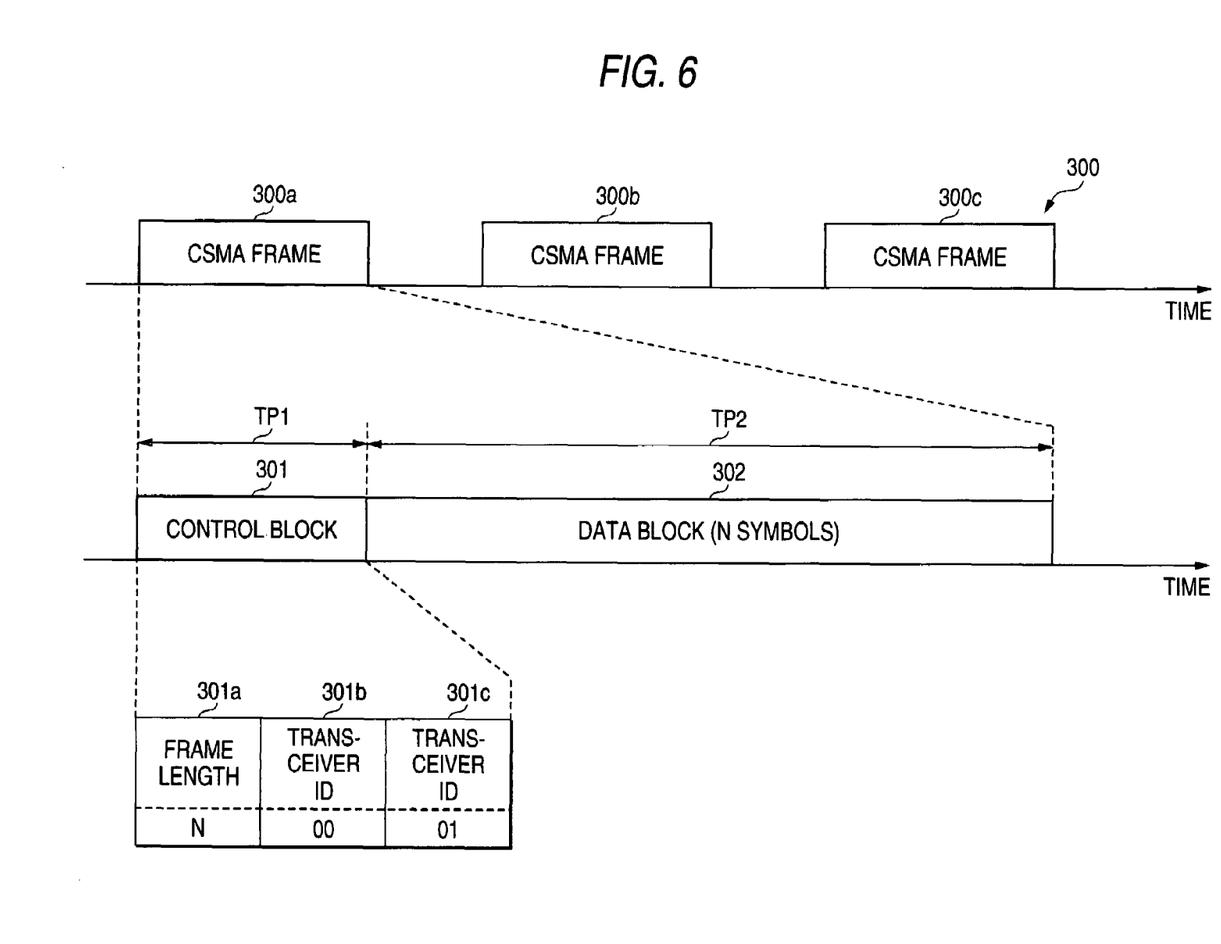
FIG. 6 is a schematic diagram showing a frame configuration involving a time division multiple communication method, according to a third embodiment of the invention.

Another channel configuration used in the communication system described in the first embodiment will be described in detail in the third embodiment. CSMA is used as a time division multiple communication method. As shown in FIG. 6, a CSMA frame 300a includes a control block 301 and a data block 302. The control block 301 includes frame length information 301a, transmitter ID information 301b, and receiver ID information 301c. The control block 301 is a signal section including data that show how long the data will be sent with reference to the time when the control block 301 was received by a transceiver 100. The data block 302 includes N symbols. The data block 302 is a signal section that includes data to be transmitted.

An operation of a communication system using the above-mentioned frame will be described below.

Since CSMA is used as a time division multiple transmission method, a transceiver that will receive data has no information about when the CSMA frame 300 will be transmitted, in other words, when the CSMA frame 300 will be received by the transceiver. Accordingly, the transceiver keeps waiting for receiving the CSMA frame 300, and in the transceiver, the switch 104 stays connected to the receiving circuit 103.

When the CSMA frame 300a is transmitted from a transceiver working as a transmitter, all transceivers except the transceiver working as a transmitter are ready for receiving data in a period TP1, in which the control block 301 is transmitted. Each of the transceivers will recognize by demodulating the control block 301 (1) which transceivers will be used in a communication related to the CSMA frame 300a, and (2) how long the communication related to the CSMA frame 300a will continue. FIG. 6 shows that the communication will be performed for N symbols length between a transceiver "00" and a transceiver "01".

After receiving the CSMA frame 300a, the switch 104 of each transceiver with no relation to the communication disconnects between the transmitting circuit 102 or the receiving circuit 103 and the transmission line 105, and then connects between the transmission line 105 and a terminal with high impedance for a length of time corresponding to the N symbols. Meanwhile, the switch 104 of each transceiver with relation to the communication will switch to the second position connected to the receiving circuit 103 to receive signals, and will receive and demodulate signals corresponding to the data block 302.

After the operation of transmitting the data block 302, all transceivers return to the receiving condition ready to receive data, that is, each switch 104 of all transceivers switches to the second position connected to the receiving circuit 103 if the switch 104 is not connected to the receiving circuit 103 or each switch 104 keeps the second position if the switch 104 is already connected to the receiving circuit 103. Then all transceivers start to wait for the next CSMA frame 300b.

The above-mentioned configuration makes it possible to improve transmission efficiency because the transceiver working as a receiver can receive data with maximal receiving power, in other word, with maximal S/N ratio during transmitting data of the data block 302.

In addition, the control block 301 can include the numbers of a unique unit by setting a particular frame length as a unique unit instead of information of the frame length 301a.

Furthermore, it is also possible to achieve the maximal receiving power by disconnecting each switch 104 to each of both the transmitting circuit 102 and the receiving circuit 103 in all transceivers with no relation to the communication as mentioned in the first and second embodiments.

FOURTH EMBODIMENT

In the fourth embodiment, it is assumed that a modulation scheme will be changed corresponding to a result of channel estimation, which is performed in advance of a communication.

Figure 7:
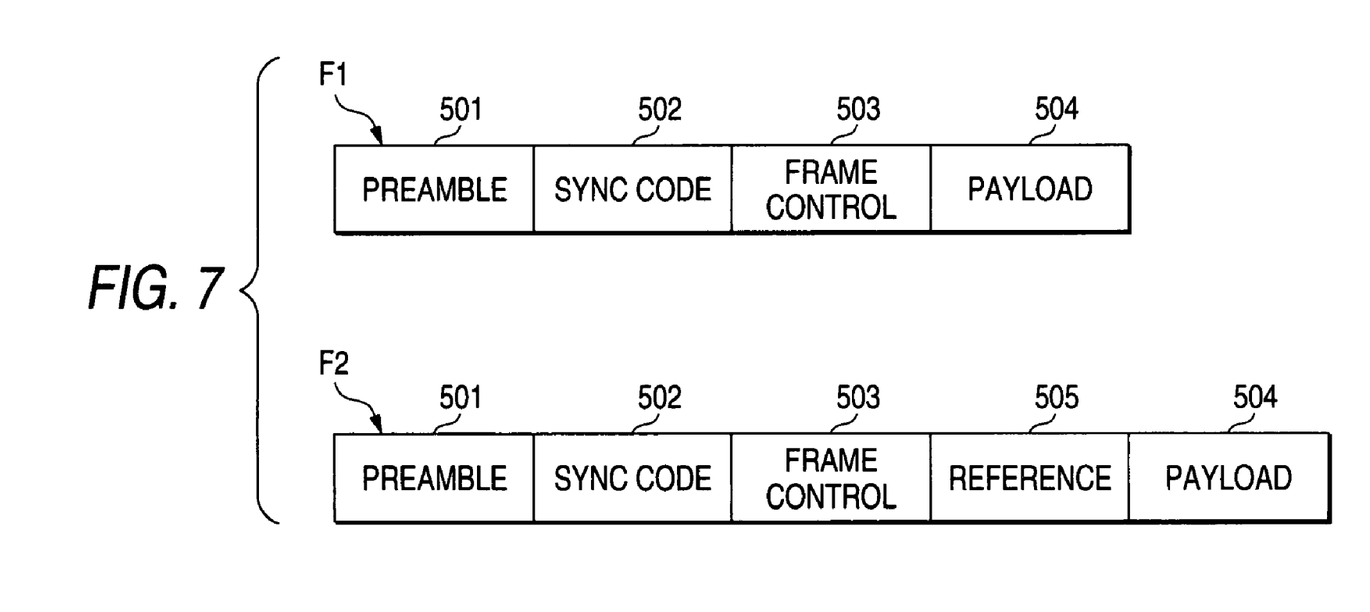
FIG. 7 is a schematic diagram showing a frame configuration involving a time division multiple communication method, according to a forth embodiment of the invention.

As shown in FIG. 7, two kinds of frame configuration F1 and F2 are prepared in the embodiment 4. The frame configuration F1 includes a preamble 501, a synchronization code 502, a frame control 503, and a payload 504. The frame configuration F2 includes a preamble 501, a synchronization code 502, a frame control 503, a payload 504, and a reference 505. The difference between the frame configuration F1 and F2 is only whether or not the reference 505 exists. In these frames F1 and F2, the preamble 501 is used for symbol timing synchronization and/or channel estimation. The synchronization code 502 shows when or where a logic frame begins. The frame control 503 includes information such as a transmitter ID, a receiver ID, frame length and presence or absence of the reference 505. The payload 504 includes data to be transferred from a physical layer to an upper layer. The reference 505 is used for channel estimation.

An operation of a communication system using the above-mentioned frame will be described with reference to FIG. 8.

Channel estimation is performed for each of all combinations of two transceivers which will communicate with each other. The modulation scheme for the payload 504 when all transceivers operate and when only one transceiver operates is decided.

Figure 8:
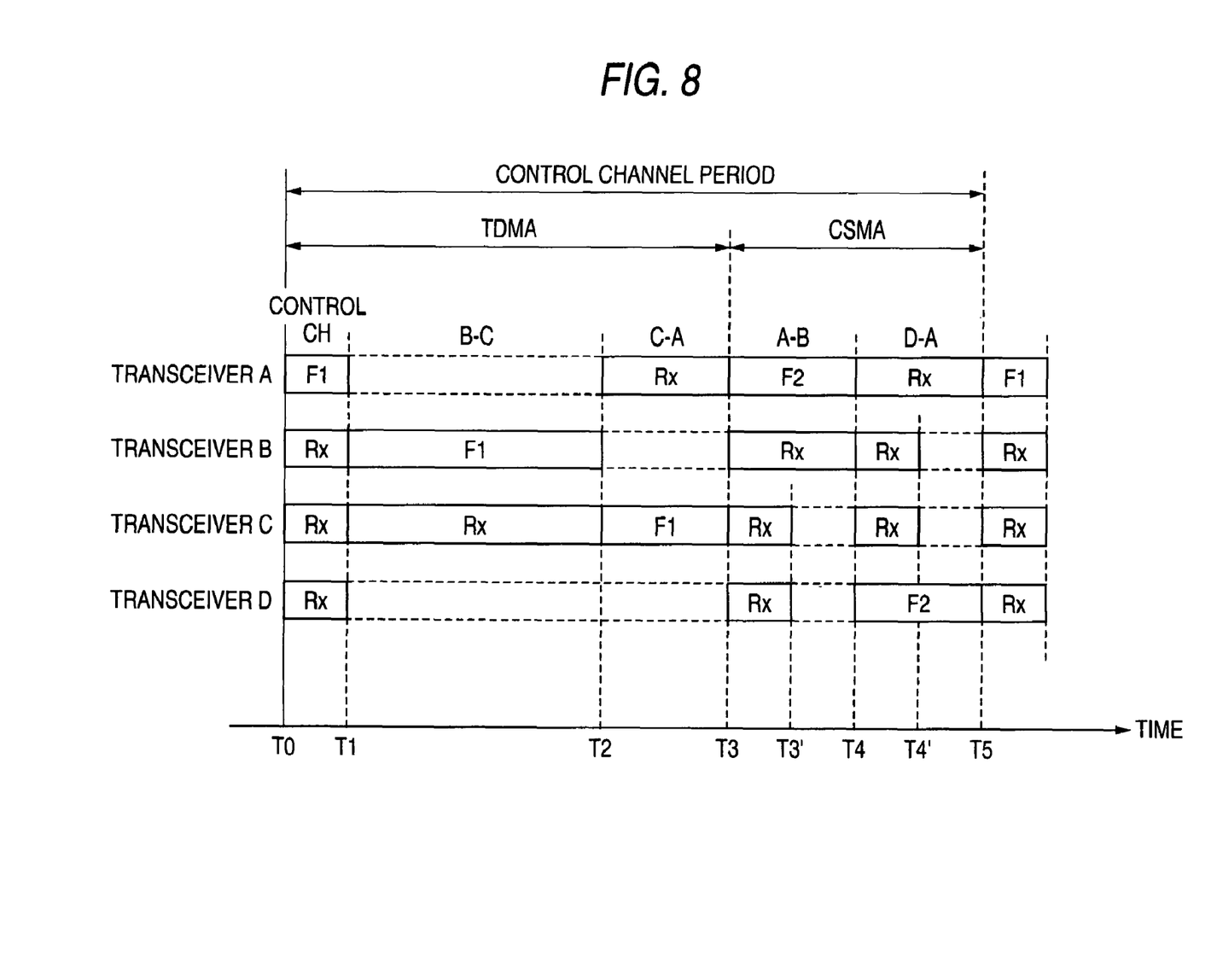
FIG. 8 is a schematic diagram showing an operation of a communication system according to the fourth embodiment of the invention.

In FIG. 8, a period of time from T0 to T1 is a communication period of a control channel. The next period of time from T1 to T3 is a communication period that a communication channel is controlled by the control channel, in which period TDMA is adopted. The next period of time from T3 to T5 is a communication period that a communication channel is not controlled by the control channel, in which period CSMA is adopted and all transceivers A, B, C, and D compete to get a communication channel. That is, both TDMA and CSMA are used in a communication in a single control channel period.

A control channel is sent from the transceiver A with the frame configuration F1 in the period of time from T0 to T1. All transceivers except the transceiver A receive the control channel and recognize that the transceivers B and C will communicate with each other in a period of time from T1 to T2 and the transceivers A and C will communicate with each other in a period of time from T2 to T3. This means that each of transceivers A to D recognizes its condition among transmitting condition, receiving condition, or disconnecting condition at each of the time from T1 to T2 and the time from T2 to T3.

Generally speaking, a result of a channel estimation using the preamble 501 among all transceivers is different from a result of a channel estimation between two transceivers also using the preamble 501 because there are more than two transceivers on the transmission line when the preamble 501 is sent from a transceiver. However, in the periods from T1 to T2 and from T2 to T3, each channel estimation is performed using the preamble 501 under a condition that only two transceivers (B and C, or A and D) are connected to the transmission line. Therefore, the result of the channel estimation using the preamble 501 can be used for the communication of the payload 504. On the other hand, prior to this invention, the result of the channel estimation using the preamble 501 was not used for the communication of the payload 504 because the result of the channel estimation using the preamble 501 included an influence of transceivers which have no relation to the communication.

On the other hand, since CSMA is adopted in the period of time from T3 to T5, each of transceivers A to D does not recognize its condition among transmitting condition, receiving condition, and disconnecting condition. Thus, all of the transceivers B, C, and D, except the transceiver A that obtains a communication channel, transit to the receiving condition by switching the switch 104 to the second position. At this time, the transceiver A sends the frame configuration F2. All of the transceivers B, C, and D demodulate the preamble 501, perform channel estimation, recognize starting position of the logic frame by modulating the synchronization code 502, and get information such as which transceiver sends the frame, which transceiver is the object to be sent the frame, and how long the frame is by receiving the frame information 503.

By performing all of above-mentioned procedures in all transceivers, the transceivers A and B recognize to communicate with each other in the period of time from T3 to T4. The transceivers C and D with no relation to the communication transit to the disconnecting condition by switching the switch 104 to the third position. Then, the transceiver B keeps the receiving condition, receives the reference 505, and again performs the channel estimation based on reference 505. The reason why the transceiver B performs the channel estimation again is because the condition of the transmission channel can change from the original condition existing at the time the preamble 501 was received and the transceivers C and D transited to the disconnecting condition. The transceiver B demodulates data of the payload 504 using the result of the channel estimation obtained by using the reference 505. An operation in a period of time from T4 to T5 is almost the same except for changing the transceivers communicated with each other from the transceivers A and B to the transceivers D and A.

By using the above-mentioned configuration, a transceiver working as a receiver can receive data transmitted from a transceiver working as a transmitter with maximal receiving power when each of transceivers A, B, C, and D receive the payload 504 of each frame. Accordingly, the above-mentioned configuration makes it possible to achieve higher modulation speed with the communication. That means to be able to achieve higher transmission efficiency or higher efficiency in the use of the transmission channel. In particular, this configuration well performs in a communication system using two communication method or more like both CSMA and TDMA.

FIFTH EMBODIMENT

In the fifth embodiment, channel estimation should be performed in advance, and then a modulation scheme for a communication will be decided using the result of the channel estimation. There may be any number of possible modulation schemes to be used, but for illustration purposes, in this embodiment, there are two kinds of modulation schemes: QAM1 and QAM2. QAM1 is for a condition that all transceivers are under receiving condition. QAM2 is for a condition that less than all transceivers have a permission of communication, and are under receiving condition. Furthermore, two kinds of frame configurations F1 and F2 are used in the fifth embodiment just as in the fourth embodiment.

Only the CSMA period illustrated in FIG. 8 will be described, and description of other periods will be omitted in the fifth embodiment.

In the CSMA period, if all transceivers are under receiving condition when the payload 504 is received, the payload 504 is modulated/demodulated using QAM1 and transmitted using the frame configuration F1. Meanwhile, if less than all transceivers have a permission of communication, and are under receiving condition, the payload 504 is modulated/demodulated using QAM2 and transmitted using the frame configuration F2.

It is assumed that QAM1 is 16 QAM (4 bit/symbol), QAM2 is 64 QAM (6 bit/symbol), a size of transmission data of the payload 504 is 12 bits (3 symbols with 16 QAM and 2 symbols with 64 QAM), and the reference part 505 in the frame configuration F2 is 4 symbols.

Figure 9:
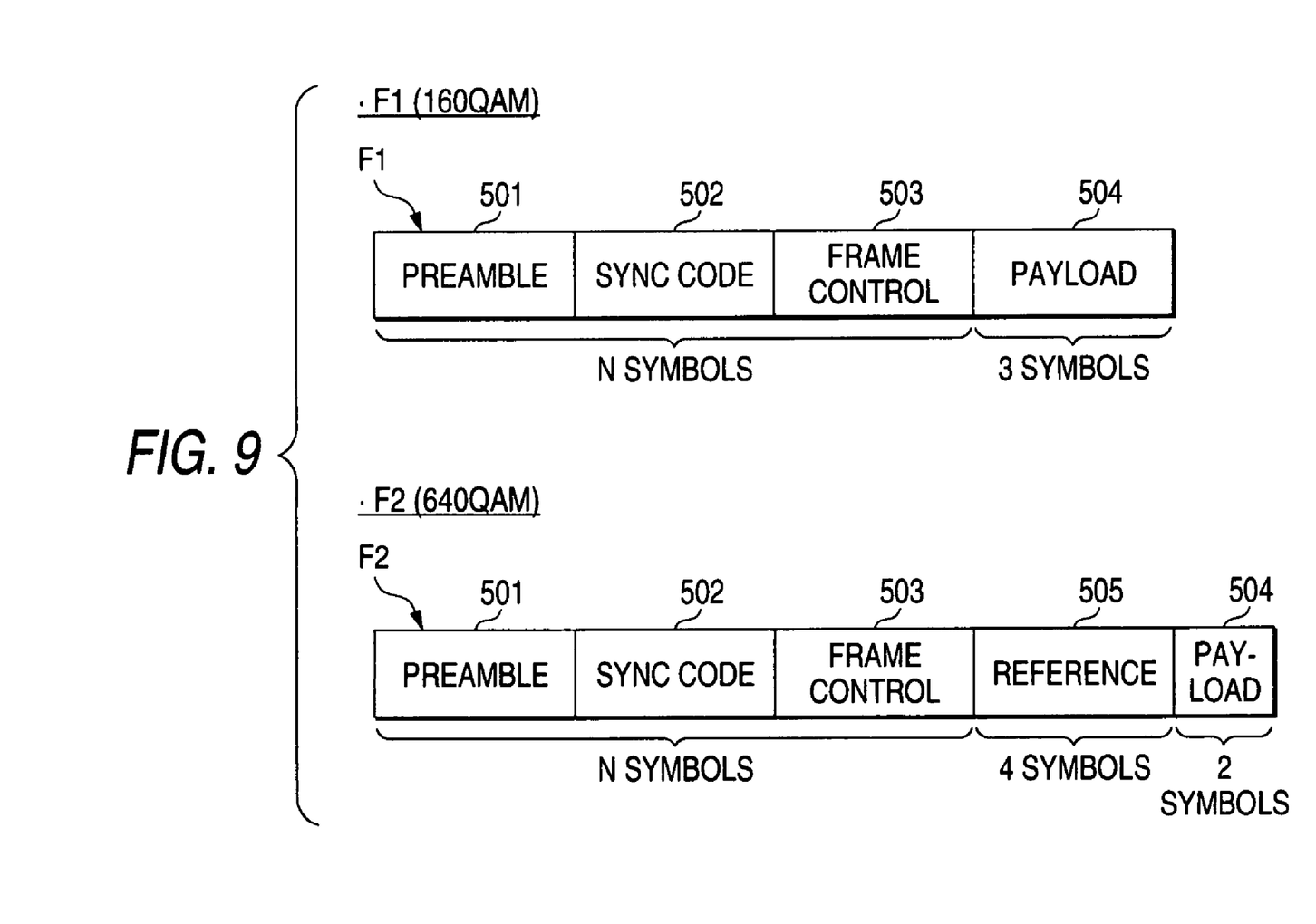
FIG. 9 is a schematic diagram showing a frame configuration involving a time division multiple communication method, according to a fifth embodiment of the invention.

As shown in FIG. 9, a frame length of the frame configuration F1 is (N+3) symbols, and a frame length of the frame configuration F2 is (N+6) symbols. Therefore, in this case, the transmission efficiency of the frame configuration F1 is higher than the transmission efficiency of the frame configuration F2, although the modulation speed of F2 is higher than the modulation speed of F1. When data of the payload with less than 53 bit (for example 52 bits (13 symbols with 16 QAM and 9 symbols with 64 QAM)) are sent, the transmission efficiency of F1 (N+13 symbols) is equal to or more than the transmission efficiency of F2 (N+4+9 symbols) because of the effect of adding the reference 505 to the frame F1. On the contrary, when data of the payload with equal to or more than 53 bit are sent (for example 53 bits (14 symbols with 16 QAM and 9 symbols with 64 QAM)), the transmission efficiency of F2 (N+4+9 symbols (53 bits)) is higher than the transmission efficiency of F1 (N+14 symbols (53 bits))

Therefore, it is possible to improve the transmission efficiency in the CSMA period by judging in a transceiver working as a transmitter which frame configuration F1 or F2 can provide higher transmission efficiency than the other and by adding an information which frame configuration F1 or F2 is used to the frame information 503.

In addition, the configurations of the first to fifth embodiments can be combined with each other in many ways, as needed.

Furthermore, the first to fifth embodiments will be useful in a communication system like Power Line Communication (PLC), which uses a power line as a transmission line, because in the PLC several modems will be connected in parallel to a modem operating as a transmitter.

CROSS REFERENCE TO RELATED APPLICATION

This application is based upon and claims the benefit of priority of Japanese Patent Application No. 2004-133128 filed on Apr. 28, 2004, the contents of which is incorporated herein by reference in its entirety.

What is claimed is:

1. A communication method among three or more transceivers, said communication method comprising:
(a) establishing a condition wherein each of said three or more transceivers is in a communication ready state with a transmission line at a same time, wherein said communication ready state comprises a connection state of being connected to the transmission line without resulting in a high impedance in the connected transceiver;
(b) thereafter, disabling at least one transceiver among said three or more transceivers, which have no relation to a communication, from said communication ready state by disabling an ability of said at least one transceiver to communicate with respect to said transmission line; and
(c) performing a channel estimation between any two transceivers, of said three or more transceivers, which have a relation with said communication, wherein:
the communication method involves a TDMA period, a CSMA period and a frame configuration that has a first frame and a second frame, said first frame including a first known data part, a second known data part, said communication method further comprises a communicating step performed in said TDMA period by using said first frame, and a communicating step performed in said CSMA period by using said second frame after said any two transceivers which have said relation to the communication become under a receiving condition, and a decision whether to use said first frame or said second frame in the communication is made in accordance with which of said first frame and said second frame is shorter.

2. A communication system comprising a plurality of transceiver apparatuses for performing communication with a first transceiver through a transmission line connected to a second transceiver, each of said transceiver apparatuses comprising:

a transmitter that sends data for the communication;

a receiver that receives data for the communication;

a switch that switches among (i) connecting said transmitter to the transmission line, (ii) connectincr said receiver to the transmission line, or (iii) disconnecting both said transmitter and said receiver from the transmission line or increasing a value of impedance of said transceiver apparatus; and a controller that controls said switch to cause (i) a first condition in which said transmitter or said receiver is connected to the transmission line, at a time that said transceiver apparatus performs communication with the first transceiver or (ii) a second condition in which both said transmitter and said receiver are disconnected from the transmission line or in which said impedance of said transceiver apparatus is increased relative to said first condition, at a time that said transceiver apparatus does not perform communication with the first transceiver; and a channel estimation unit that performs a channel estimation between said transceiver apparatus and said first transceiver over the transmission line after (i) said transceiver apparatus sets said switch at the first condition, (ii) said first transceiver sets a condition of a switch in the first transceiver at the first condition and (iii) the second transceiver sets a condition of a switch in the second transceiver at the second condition, wherein:

said receiver receives a frame which includes a result of said channel estimation and a payload, and said controller demodulates said payload using said result of said channel estimation, and wherein:

said communication system employs a TDMA period, a CSMA period and a frame configuration that has a first frame and a second frame, said first frame including a first known data part and said second frame including a second known data part, at least some of a plurality of transceivers perform a communication in said TDMA period by using said first frame, at least some of said plurality of transceivers perform a communication in said CSMA period by using said second frame after transceivers not permitted to perform the communication in the CSMA period become under said second condition, and at least some of said plurality of transceivers decide whether to use said first frame or said second frame in the communication in accordance with which of said first frame and said second frame is shorter.

3. A communication system comprising a plurality of transceiver apparatuses for performing communication with a first transceiver through a transmission line connected to a second transceiver, each said transceiver apparatus comprising:

a transmitter that sends data for the communication;

a receiver that receives data for the communication;

a switch that switches among (i) connecting said transmitter to the transmission line, (ii) connecting said receiver to the transmission line, or (iii) disconnecting both said transmitter and said receiver from the transmission line or increasing a value of impedance of said transceiver apparatus; and a controller that controls said switch to cause (i) a first condition in which said transmitter or said receiver is connected to the transmission line, at a time that said transceiver apparatus performs communication with the first transceiver or (ii) a second condition in which both said transmitter and said receiver are disconnected from the transmission line or in which said impedance of said transceiver apparatus is increased relative to said first condition, at a time that said transceiver apparatus does not perform communication with the first transceiver; and a channel estimation unit that performs a channel estimation between said transceiver apparatus and said first transceiver over the transmission line after (i) said transceiver apparatus sets said switch at the first condition, (ii) said first transceiver sets a condition of a switch in the first transceiver at the first condition and (iii) the second transceiver sets a condition of a switch in the second transceiver at the second condition, wherein:

said receiver receives a frame which includes a result of said channel estimation and a payload, and said controller demodulates said payload using said result of said channel estimation, and wherein:

one of said transceiver apparatuses operating as a transmitter and another of said transceiver apparatuses operating as a receiver modulate/demodulate communication data communicated therebetween using the one of a first frame and a second frame that has a higher transmission efficiency, said first frame being sent using a first transmission scheme, and said second frame being sent using a second transmission scheme.

* * * * *

UNITED STATES PATENT AND TRADEMARK OFFICE
CERTIFICATE OF CORRECTION

PATENT NO. : 7,280,553 B2 Page 1 of 1
APPLICATION NO. : 11/113322
DATED : October 9, 2007
INVENTOR(S) : Nobutaka Kodama et al.

It is certified that error appears in the above-identified patent and that said Letters Patent is hereby corrected as shown below:

Claim 1, at column 11, lines 1-2, which reads "frame and a second frame, said first frame including a first known data part, a second known data part," should read --frame and a second frame, said first frame including a first known data part, and said second frame including a second known data part,--.

Signed and Sealed this

Twelfth Day of August, 2008

JON W. DUDAS
*Director of the United States Patent and Trademark Office*